United States Patent
Busaba et al.

(10) Patent No.: US 7,412,476 B2
(45) Date of Patent: *Aug. 12, 2008

(54) DECIMAL MULTIPLICATION FOR SUPERSCALER PROCESSORS

(75) Inventors: Fadi Y. Busaba, Poughkeepsie, NY (US); Steven R. Carlough, Poughkeepsie, NY (US); Christopher A. Krygowski, Lagrangeville, NY (US); John G. Rell, Jr., Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 11/460,296

(22) Filed: Jul. 27, 2006

(65) Prior Publication Data

US 2006/0259530 A1    Nov. 16, 2006

Related U.S. Application Data

(63) Continuation of application No. 10/436,392, filed on May 12, 2003, now Pat. No. 7,167,889.

(51) Int. Cl.
*G06F 7/523*    (2006.01)
(52) U.S. Cl. ...................................... 708/623
(58) Field of Classification Search ................... 708/623
See application file for complete search history.

(56) References Cited

U.S. PATENT DOCUMENTS

| | | | |
|---|---|---|---|
| 3,578,961 A | 5/1971 | Miu | |
| 3,641,331 A | 2/1972 | Kreidermacher et al. | |
| 4,390,961 A | 6/1983 | Negi et al. | |
| 4,484,300 A | 11/1984 | Negi et al. | |
| 4,745,569 A | 5/1988 | Yamaoka et al. | |
| 5,379,245 A | 1/1995 | Ueda | |

OTHER PUBLICATIONS

"Packed Decimal Multiply Algorithm"; Inventor: Hoffman, RL Schardt, TL; Pubname: TDB 10-75 pp. 1562-1563; Disclosure No. RO8750134; Oct. 1975.

"High Performance Two Cycle Loop Decimal Multiply Algorithm"; Inventors: Angiulli, JM Chang, DC Hornick, JC Nohilly, WJ Zajac, MW; Pubname: TDB 09-81 pp. 1845-1849; Disclosure No. PO8800209; Sep. 1981.

IBM InfoGate; "Improved Table Assisted Addition and Multiplication Methods"; Inventor: Wingert, JA; Pubname: TDB 02-83 pp. 4742-4743; Disclosure No. CT8800050; Feb. 1983.

*Primary Examiner*—D. H. Malzahn
(74) *Attorney, Agent, or Firm*—Cantor Colburn LLP; Lynn Augspurger

(57) ABSTRACT

A method for decimal multiplication in a superscaler processor comprising: obtaining a first operand and a second operand; establishing a multiplier and an effective multiplicand from the first operand and the second operand; and generating and accumulating a partial product term every two cycles. The partial product terms are created from the effective multiplicand and multiples of the multiplier, where the effective multiplicand is stored in a first register file, the multiples being ones times the effective multiplier, two times the effective multiplier, four times the effective multiplier and eight times the effective multiplier and the partial product terms are added to an accumulation of previous partial product terms shifted one digit right such that a digit shifted off is preserved as a result digit.

4 Claims, 4 Drawing Sheets

DECIMAL MULTIPLICATION FOR SUPERSCALER PROCESSORS

CROSS REFERENCE TO RELATED APPLICATION

This application is a continuation application of U.S. Ser. No. 10/436,392, filed May 12, 2003, now U.S. Pat. No. 7,167,889, the disclosure of which is incorporated by reference herein in their entirety.

BACKGROUND

This invention relates to decimal multiplication in a superscaler processor. Decimal multiplication is a complex procedure in computer hardware. Generally, the more hardware dedicated to decimal multiplication, the faster the operation can be executed. One hardware intensive method utilizes a linear array of digit multipliers such that each multiplier block is capable of multiplying one decimal digit by one decimal digit. These modules are often implemented with a programmable logic array (PLA), memory device, or combinatorial logic. Although considered fast, with this methodology, significant hardware resources are necessary to implement the solution.

A simple solution requiring a shifter, three registers and a decimal adder builds partial products terms by adding the multiplier to an accumulated sum each cycle. The number of cycles required to compute a partial product is equal to the multiplicand digit being processed. The number of partial products that need to be computed is equal to the number of digits in the multiplicand. Once each partial product is computed the accumulated result is shifted by one digit and the next multiplicand digit is used to compute the next partial product. Although this solution requires little dedicated hardware, it requires a significant number of processing cycles to complete a single multiplication.

There are also methods for reducing the amount of computation required to generate the partial product terms by utilizing additional registers (hardware that might already be available on the processor and was originally intended for other uses). For example, a register file may be used to store all the multiples from 0 to 9 times the multiplier, requiring a 10 register memory array.

SUMMARY OF THE EXEMPLARY EMBODIMENTS

Disclosed herein in an exemplary embodiment is a method for decimal multiplication in a superscaler processor comprising: obtaining a first operand and a second operand; establishing a multiplier and an effective multiplicand from the first operand and the second operand; and generating and accumulating a partial product term every two cycles. The partial product terms are created from multiples of the effective multiplier and the multiplicand, where the effective multiplicand is stored in a first register file, the multiples being ones times the effective multiplier, two times the effective multiplier, four times the effective multiplier and eight times the effective multiplier and the partial product terms are added to an accumulation of previous partial product terms shifted one digit right such that a digit shifted off is preserved as a result digit.

These and other improvements are set forth in the following detailed description. For a better understanding of the invention with advantages and features, refer to the description and to the drawings.

BRIEF DESCRIPTION OF THE DRAWINGS

The present invention will now be described, by way of an example, with references to the accompanying drawings, wherein like elements are numbered alike in the several figures in which.

The detailed description explains the exemplary embodiments of the invention, together with advantages and features, by way of example with reference to the drawings.

DETAILED DESCRIPTION OF THE EXEMPLARY EMBODIMENTS

Disclosed herein in an exemplary embodiment is an architecture and methodology that multiplies two decimal numbers by generating and accumulating a partial product every two cycles. A minimal amount of hardware beyond that typically found in a standard superscaler fixed point unit processor 1 is required to implement this multiplication method. A 16 digit decimal adder is used to generate partial product terms. The carry out of the adder controls merge logic that effectively allows the carry digit to be shifted back into the accumulated partial product term, preventing lossy multiplication. This method also requires no additional cycles when processing operands that span more then a double-word of data (the multiplicand does not fit in a single register). Furthermore, the multiplier and multiplicand are checked for leading zeros and the operand with the least significant digits is chosen to be then effective multiplicand. This reduces the number of partial product terms that must be accumulated to compute the final product, resulting in fewer cycles for the operation. The number of processor cycles required in the fixed point unit for this multiplication method to complete is equal to two times number of digits in the multiplier or multiplicand (which ever is shorter unless the multiplicand has more then a double-word of significant digits) plus either 8 or 9 cycles (for setup and completion), depending on data alignment.

Decimal multiplication operations often involve operands that are longer than the dataflow width. For example, a decimal multiplication in one known architecture multiplies two operands represented in Binary Coded Decimal (BCD) format. The first operand (the multiplicand) can be up to 16 Bytes (31 numeric BCD digits plus a sign digit) in length and the second operand (the multiplier) can be up to 8 Bytes (15 numeric BCD digits plus a sign digit) in length, while the processor employs only an 8 Byte Dataflow.

The Superscaler Fixed Point Unit Hardware

Figure 1:
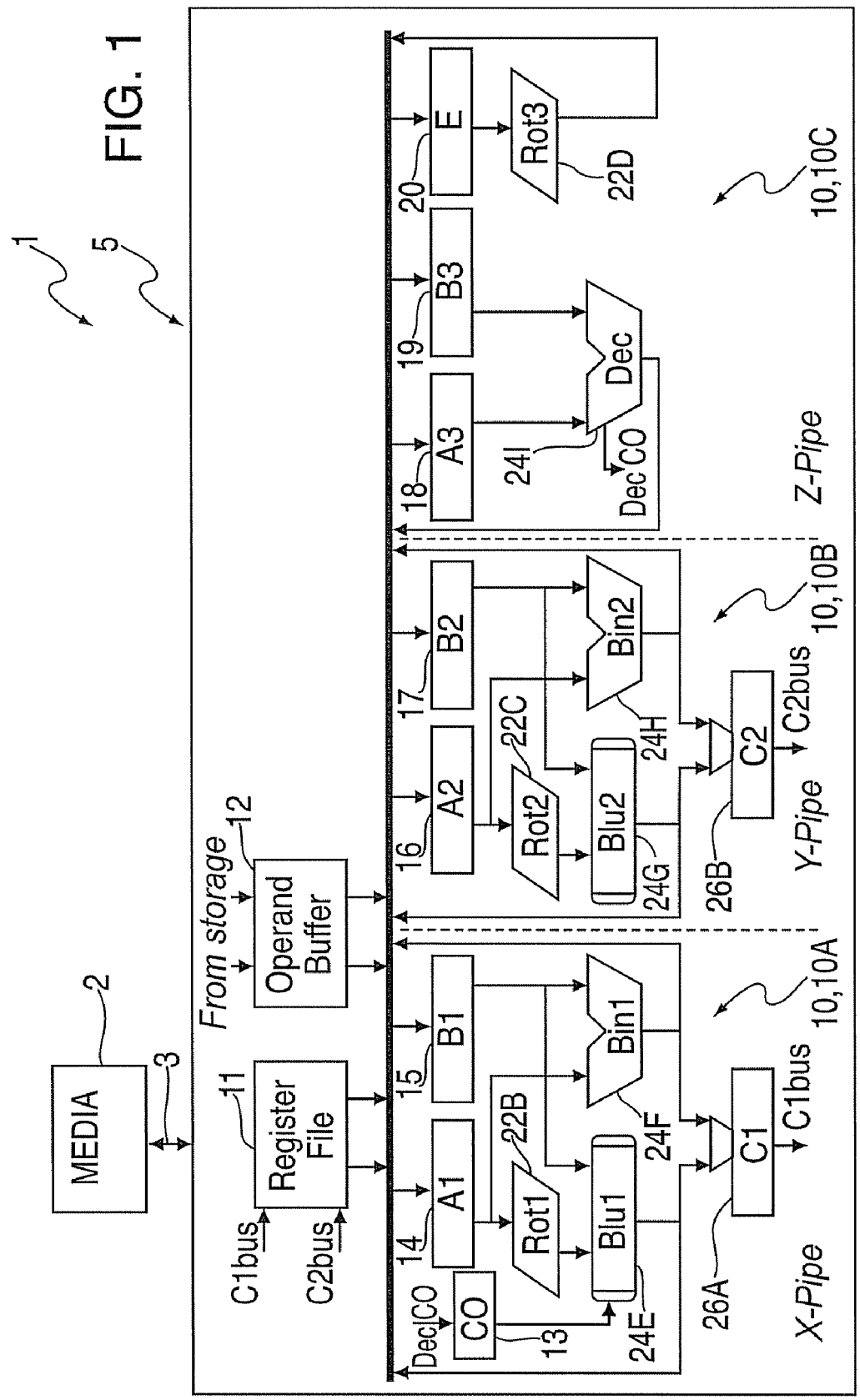
FIG. 1 depicts a hardware architecture and data flow for a fixed point unit of an exemplary embodiment.

Referring to FIG. 1, a hardware architecture 5 implementation for a fixed point unit of a processor 1 of an exemplary embodiment used for the multiply algorithm is depicted. The architecture 5 includes, but is not limited to, 3 or more pipes 10, (e.g., an X-pipe 10A, a Y-pipe 10B, and a Z-pipe 10C), as well as a 16-word by 64-bit general purpose register file (RF) 11, and an operand buffer 12 that buffers read data from storage. The X-pipe 10A includes 64-bit operand registers A1 register, denoted (A1) 14 and B1 register denoted (B1) 15, the Y-pipe 10B includes similar operand registers, A2 register denoted (A2) 16 and B2 register, denoted (B2) 17, and the Z-pipe 10C includes operand registers A3 register, denoted (A3) 18, B3 register, denoted (B3) 19, and E register denoted (E) 20. The source data for each of these registers e.g., 14, 15; 16, 17; and 18, 19, 20 may come from the Register File (RF) 11, the Operand Buffer 12, or any of the execution units 24, 24E, 24F, 24G, 24H, or 24I. The A1 14 register of the X-pipe 10A and A2 16 register of the Y-pipe 10B feed bit rotators 22, denoted Rot1 22B and Rot2 22C respectively. Rot1 22B and Rot2 22C provide one of the source operands for the Bit Logic Units, denoted Blu1 24E and Blu2 24G respectively. Among other logical functions, the Bit Logical Units are capable of performing a bit-wise merge function between the input operands (Rot1 22B and the B1 register 15 for Blu1 22E; Rot2 22C and the B2 register 17 for Blu2 24G). The X-pipe 10A and Y-pipe 10B each also include another execution unit 24 Binary adder (Bin1 24F and Bin2 24H), A1 register 14 and B1 register 15 provide the source operands for Bin1 24F, and A2 register 16 and B2 register 17 provide the source operands for Bin2 24H. The A3 register 18 and B3 register 19 provide the source operand for a Decimal Adder (Dec) 22I. The Z-pipe 10C also contains a nibble rotator 24D which is fed by the E register 20. The X-pipe 10A also includes a carry out register 13 to hold a carry bit from the decimal adder (Dec) 22I. Two output registers 24 denoted C1 register 26A and C2 register 26B respectively, are used to write data to the general purpose register file 11 also denoted (RF) and to storage (not shown). Two values may be written to and four values may be read from the RF 11 in a single cycle. Additional logic not depicted may be included to address data handling such as detecting leading zeroes and checks for valid decimal data.

It will be appreciated that in an alternative embodiment of the X-pipe 10A, bit rotator Rot1 22B operated primarily as a shifter with a wrap around capability. For example, as bits are shifted to the right, out the least significant digit, they are wrapped around and fill the register from the left at the most significant digit. Moreover, the bit rotator Rot1 22B, carry out register 13, and bit logic unit, Blu1 24E may readily be combined as a single shifter with the capability to shift in the carry out bit from the carry out register 13 if set.

Multiplication Algorithm

Figure 2:
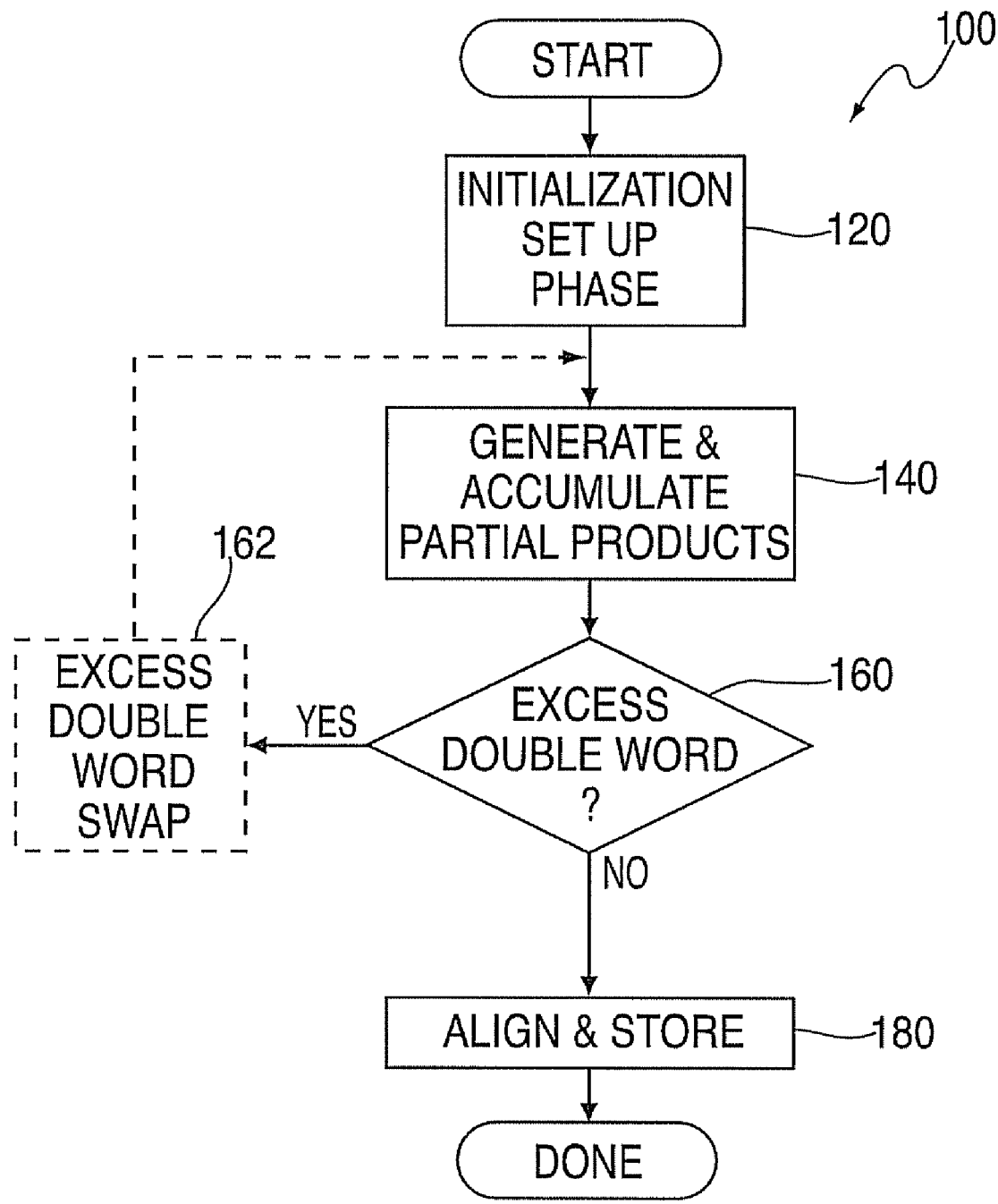
FIG. 2 depicts a simplified flowchart of a decimal multiplication methodology in accordance with an exemplary embodiment.

Turning now to FIG. 2 as well, also disclosed herein is a decimal multiplication methodology and algorithm 100. The methodology 100 of an exemplary embodiment initiates with an initialization setup phase or process 120 for selection of a preferred multiplicand. The methodology continues with the partial product generation and accumulation process of process block 140. Optionally, the methodology 100 may also include an additional process to address multiplicands that exceed the maximum double-word length of a register as depicted at decision block 160 and process block 162. Finally, the multiplication methodology 100 completes a process to align the data from each register and store it as depicted at process block 180. Turning now to the details of the multiplication methodology 100 of an exemplary embodiment.

Initialization Procedure

Figure 3:
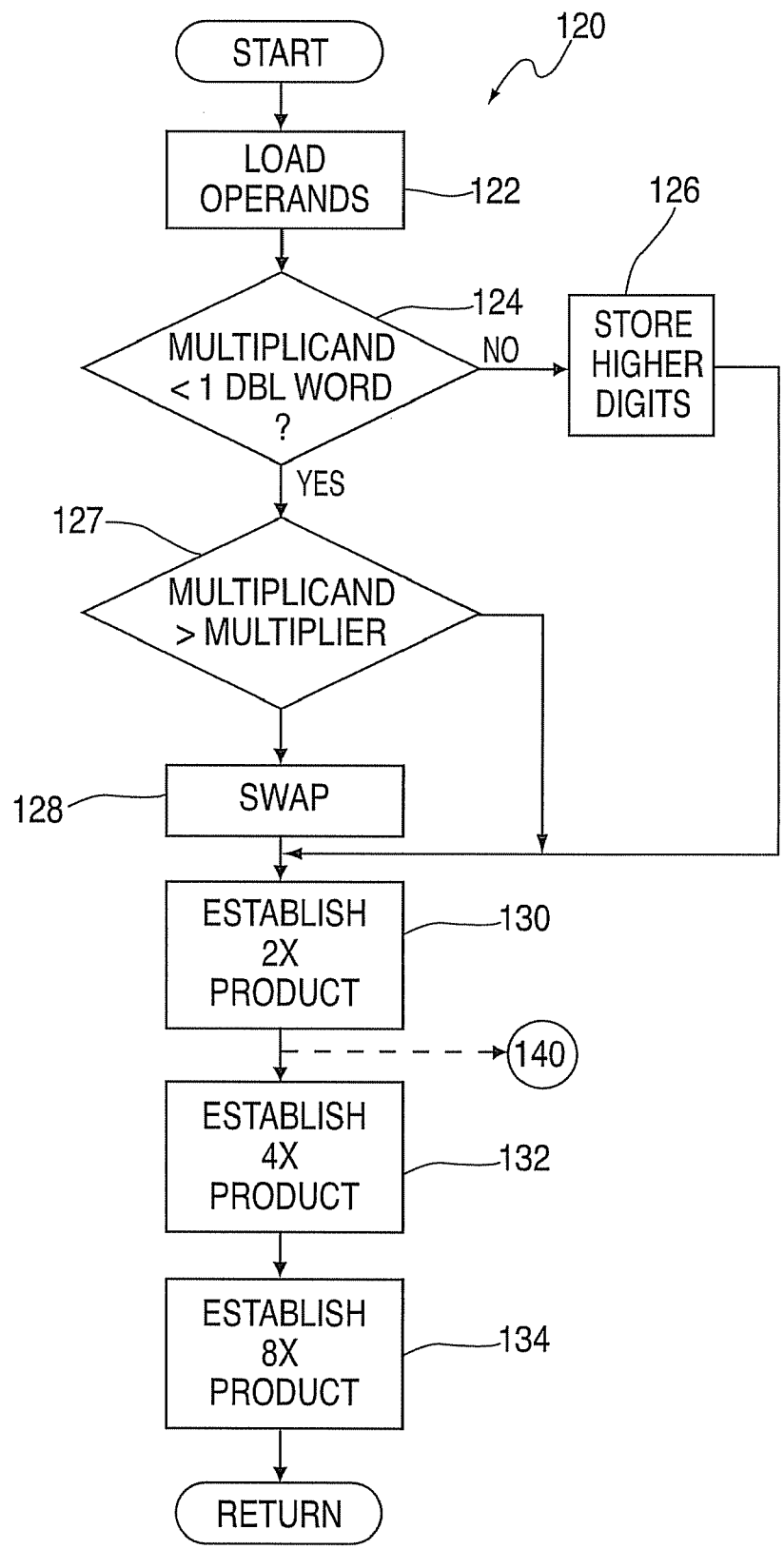
FIG. 3 depicts a flowchart for an initialization process in accordance with an exemplary embodiment.

Referring now to FIG. 3 as well, a flowchart is depicted for the initialization process 120. In an exemplary embodiment, at process block 122 the multiplier and multiplicand are loaded from the operand buffer 12 and checked for validity. At decision block 124, the significant digits of the multiplier and multiplicand are also checked and if the multiplicand has less then one double-word of significant digits. Decision block 127 determines if the multiplier has fewer significant digits then the multiplicand and if this case is true the multiplier becomes the effective multiplicand and the multiplicand becomes the effective multiplier as depicted at process block 126. It will be appreciated that this transposition reduces the number of iterations necessary to compute the final result since two cycles of processing are necessary for each significant digit of effective multiplicand data. The above mentioned process describes the setup phase of the multiplication algorithm 100. Therefore in an exemplary embodiment it is preferable, but not necessary to configure the multiplicand as the shorter of the two operands to be multiplied. It should be appreciated that although the initialization process 120 or setup phase is not completed until cycle seven (the initialization process requires a total of six cycles), the multiplication algorithm 100 takes advantage of bypass paths to initiate processing product digits starting in cycle 4. Effectively, this approach "hides" all but the first two cycles of the setup procedure. Such an approach shortens overall cycle requirements for performing a decimal multiplication. Reduced cycle count and cycle time or instruction execution time requirements are highly beneficial to the operation of all processors including superscaler processors 1.

Continuing now with FIGS. 1-3 a detailed description of the initialization process 120 is provided.

Cycle 1:

To initiate the process 100 it will be appreciated that the appropriate values of the multiplicand and multiplier need to be loaded in appropriate registers. Moreover, it is well understood that one method to compute a decimal multiplication is to accumulate partial products. In an exemplary embodiment of the multiplication methodology 100 a set of products corresponding to one, two, four, and eight times e.g., (1×), (2×), (4×), and (8×) the multiplier are computed and stored in registers RF 11 to facilitate the partial product generation. The initialization process 120 enables these computations while "loading" the registers A1 14, B1 15, A2 16, B2 17, A3 18, B3 19, and E 20 of the pipelines 10A, 10B, and 10C respectively to perform the multiplication.

Corresponding to process block 122, the multiplicand high word (or entire multiplicand if it is less then or equal to one double-word in length) is loaded into registers A1 14 and B1 15 respectively. The multiplier is loaded into registers A2 16 and B2 17 respectively. The data of the two operands is checked for validity and leading zeros are detected. The Write and Address signals for the contents of a general register RF word 0 (RF0) are set in the X-pipe 10A.

Cycle 2:

The multiplicand low word is loaded into register A1 14 if the multiplicand is greater then a double-word in length. The data is checked for validity, the sign of the product is computed and the decimal adder 24I output is set to force the appropriate resulting sign. The output for the binary adder Bin1 24F is set to "1". The multiplicand (or its high word in the case that its longer then a double-word) is loaded into register E3 20. The multiplier and multiplicand are compared to determine if they can be and should be transposed as described above and as depicted at decision block 124, to improve performance. If the multiplicand contains more then a double-word of significant digits then a swap is not allowed and the high double-word digits are saved for later processing as depicted at 126. If the multiplicand does not contain more then a double-word of significant digits, however, and it does contains fewer significant digits than the multiplier, then a swap bit is set and a multiplicand/multiplier swap will occur in the next cycle as depicted at decision block 127 and process block 128. Zero is loaded into register C1 26A for the write to general register RF0, and the write and address controls for another general register, RF2 are set in the X-pipe 10A if the swap bit is set. They are set in the Y-pipe 10B if the swap bit is not set.

Cycle 3:

Continuing with the initialization process 120 and FIG. 3, register A1 14 is loaded with the "1" from Bin1 24F (the binary adder in the X-pipe 10A) from the previous cycle, and it is rotated to the most significant nibble. Register B1 15 is loaded with the high double-word of the multiplicand from register E3 20 if the multiplicand contained more then a double-word of significant digits. Register A2 16 gets the multiplicand from bit logic unit Blu2 24G if a swap did not occur and the multiplier from bit logic unit Blu1 24E if it did. Register A2 16 now contains the effective multiplicand. Registers A3 18 and B3 19 get the multiplier from Blu2 24G if a swap did occur and the multiplicand from Blu1 24E if it did not. The decimal adder combines the contents of registers A3 18 and B3 19 (the effective multiplier). The decimal adder 24I output is now 2 times (2×) the effective multiplier as depicted at process block 130. Register C1 26B gets the multiplier from Blu1 24E and register C2 26B gets the multiplicand from Blu2 24G. The effective multiplier is selected based on the write set up in the previous cycle and is written to general register RF2. The write and address controls for general register RF4 are set in the Y-pipe 10B. Finally, register E3 20 gets the sign digit generated in the Decimal Adder 24I during the previous cycle.

Cycle 4:

Register A1 14 gets 2 times (2×) the multiplier from the Decimal Adder 24I. Register B1 15 gets the merge between the "1" nibble in the most significant digit and the multiplicand's most significant digits if there were more then a double-word of them. Register A2 16 holds the multiplicand and the least significant nibble thereof is used to determine what multiplier multiples are needed for the first partial product computation that will occur in cycle 6. This effectively begins the first step in process block 140, denoted as process block 142. It should be noted that since the registers are not yet filled with the appropriate values (see table 2) a bypassing technique is employed to facilitate the initialization process. Therefore, then if eight times (8×) is needed it will have to be bypassed from the Decimal Adder 24I and if four times (4×) is needed it will have to be bypassed from register A1 14. Register B2 17 gets the sign digit from register E3 20. Registers A3 18, B3 19, and E3 20 now also get 2× the multiplier from the Decimal Adder 24I. Register C2 26B gets 2× the multiplier from the decimal adder 24I for writing that data to RF4 during the next cycle, and the write and address controls are set in the Y-pipe 10B to write to another general register, denoted RF6. Once again, the combination of the contents from the A3 18, B3 19 each with 2× the effective multiplier formulates 4× the effective multiplier term as depicted at process block 132.

Cycle 5:

Continuing with the initialization process 120, the registers A1 14, A3 18, B3 19, E3 20, and C2 26B gets four times (4×) the multiplier from the Decimal Adder 24I. The Decimal adder now outputs eight times (8×) the multiplier, denoted in process block 134. Register C2 26B is used to write 4× term to RF6 on the next cycle. Register A2 26B gets the contents of register A2 16 the previous cycle rotated to the right by 1 nibble, then generates the next address lookup for the computation in cycle 7, denoted in process block 142. Once again, it should be noted that if 8× is needed it must be bypassed from register A2 16 in cycle 7. Write and address controls for general register RF8 are set in the Y-pipe 10B.

Cycle 6:

During cycle 6 the 8× term is stored to registers A1 14, E3 20, and C2 26B. Register C2 26B is used to write 8× term to RF8 on the following cycle. Bypassing is employed for the 4× and 8× terms for partial product generation, denoted as process block 146, on cycles 6 and 7 as previously described in cycles 4 and 5 where the actual control signals were set for that bypassing. Finally the multiplication processing of an exemplary embodiment continues as described below for the partial product generation and accumulation, where process block 140 begins a new term every second cycle. The initialization process completes during cycle 7, when the 8× term is stored into the register file RF8 and bypassing is longer needed for partial product generation 146.

Partial Product Generation and Accumulation

Once the data is loaded, a fully pipelined partial product accumulation proceeds as follows: Each partial product requires a total of six cycles of computation before it is fully accumulated with the previous partial products. However, advantageously, because of the pipelined architecture 5 and the nature of the multiplication algorithm 100 of an exemplary embodiment, a partial product accumulation can be computed every two cycles. Therefore, multiple computations occur within the six cycle total duration. A pipeline diagram of the multiplication algorithm is shown in Table 1 where X denotes any cycle that begins the first step of process block 140, denoted as process block 142:

TABLE 1

6 Stage Pipeline for Partial Product Generation and Accumulation

| Cycle X | Cycle X + 1 | Cycle X + 2 | Cycle X + 3 | Cycle X + 4 | Cycle X + 5 |
|---|---|---|---|---|---|
| A2 ⇐ Blu2; Determine RFs for Partial Product T; A3, B3 ⇐ RF; Compute Partial Product S; E, A1 ⇐ Dec; Rotate Partial Product Accumulation R and merge CO in Blu1; Rot3 rotates Partial Product Accumulation R; | RF Read for T; A3 ⇐ Dec; B3 ⇐ Blu1; Compute Partial Product Accumulation S; | A2 ⇐ Blu2; Determine RFs for Partial Product U; A3, B3 ⇐ RF; Compute Partial Product T; | RF Read for U; | A2 ⇐ Blu 2 Determine RFs for Partial Product V; | |

TABLE 1-continued

6 Stage Pipeline for Partial Product Generation and Accumulation

| Cycle X | Cycle X + 1 | Cycle X + 2 | Cycle X + 3 | Cycle X + 4 | Cycle X + 5 |
|---------|-------------|-------------|-------------|-------------|-------------|
|  | B2 ⇐ Rot 3; Rotate A2 and merge lsd of R into msd of A2 in Blu2; | E, A1 ⇐ Dec; Rotate Partial Product Accumulation S and merge CO in Blu1; Rot3 rotates Partial Product Accumulation S; | A3 ⇐ Dec; B3 ⇐ Blu1; Compute Partial Product Accumulation T; | A3, B3 ⇐ RF; Compute Partial Product U; | RF Read for V; |
|  |  |  | B2 ⇐ Rot 3: Rotate A2 and merge lsd of S into msd of A2 in Blu2 | E, A1 ⇐ Dec; Rotate Partial Product Accumulation T and merge CO in Blu1; Rot3 rotates Partial Product Accumulation T; | A3 ⇐ Dec; B3 ⇐ Blu1; Compute Partial Product Accumulation U; |
|  |  |  |  |  | B2 ⇐ Rot 3; Rotate A2 and merge lsd of T into msd of A2 in Blu2; |

Figure 4:
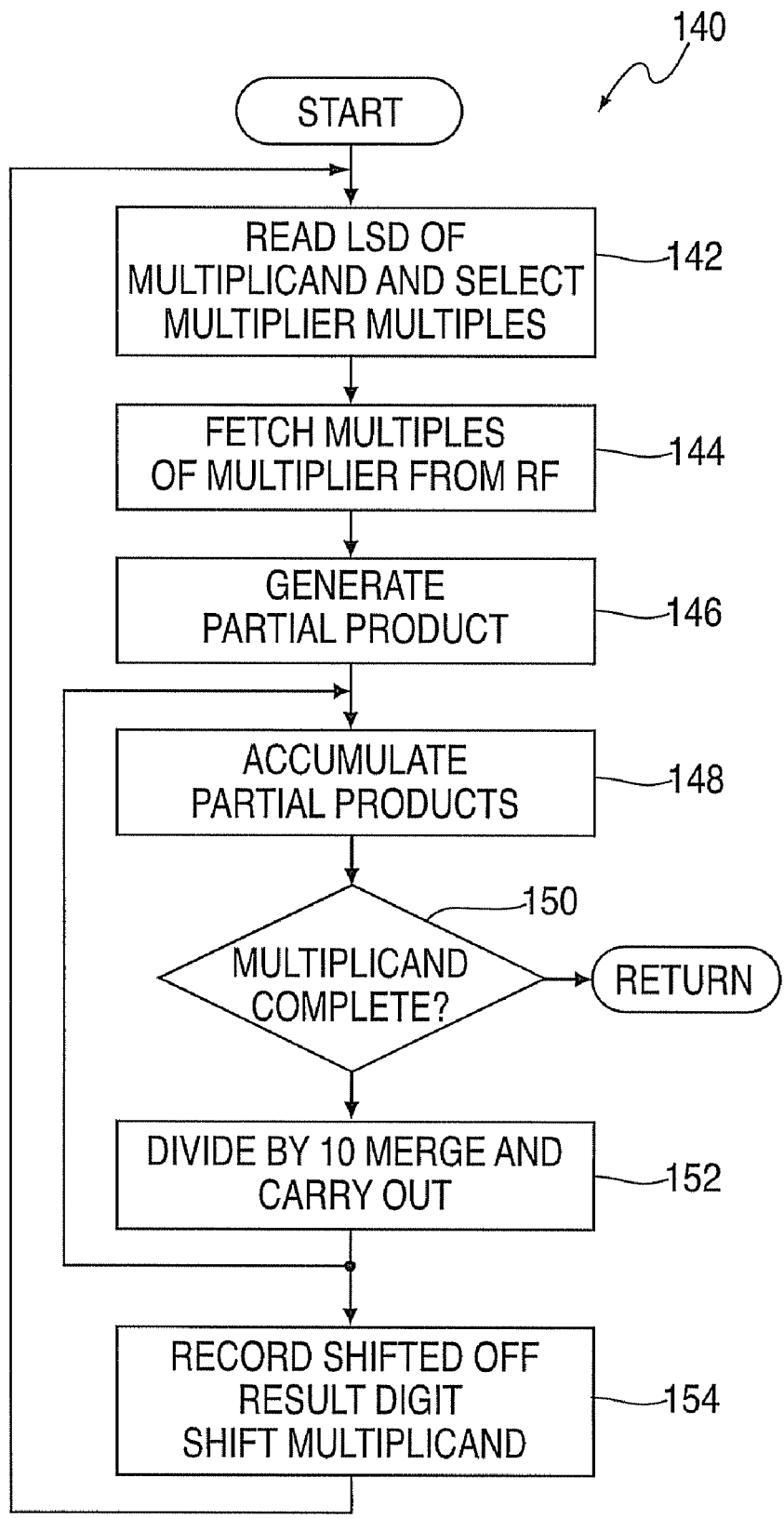
FIG. 4 depicts a flow chart for a process in accordance with an exemplary embodiment for generation and accumulation of the partial products.

Cycle X: Continuing with FIG. 2, at process block 140 the partial products are generated and accumulated. Turning now to Table 1 and FIG. 4, a flow chart of a process 140 for generation and accumulation of the partial products is depicted. In an exemplary embodiment, at process block 142 the least significant digit of the register A2 16 is read. Based on this digit, two multiples of the multiplier is selected and on the next cycle the data will be fetched from the register file 144. A lookup table (shown below) is used to determine what multiples of the operand must be accessed for the computation.

TABLE 2

Terms utilized to generate partial products from multiplier multiples.

| Multiple | Registers | Operation |
|----------|-----------|-----------|
| 0 | 0 | None |
| 1 | 2 | 1 |
| 2 | 4 | 2 |
| 3 | 2 & 4 | 1 + 2 |
| 4 | 6 | 4 |
| 5 | 6 & 2 | 4 + 1 |
| 6 | 6 & 4 | 4 + 2 |
| 7 | 8 & 2 | 8 − 1 |
| 8 | 8 | 8 |
| 9 | 8 & 2 | 8 + 1 |

Cycle X+1: The multiplier data is read from the register file 11, as denoted in process block 144.

Cycle X+2: The RF 11 data is loaded into the A3 18 and B3 19 registers and the next partial product is computed as depicted at process block 146.

Cycle X+3: The partial product is fed back to the B3 19 register and added to the previously accumulated partial products in the A3 18 register, creating the new partial product accumulation as depicted at process block 148.

Cycle X+4: Decision block 150 checks to determine if all of the multiplicand digits have been processed. If they have all been processed process 140 exits and a check is made in decision block 160 (FIG. 2) to determine if an excess double-word swap if necessary or if alignment for storage in process block 180 should occur next. If decision block 150 determines that not all of the multiplicand digits have been processed then process block 152 is entered where the partial product accumulation is fed back to the A1 14 and E 20 registers and is rotated one digit the right (divide by 10). In the X-pipe 10A, if the previous computation resulted in a decimal carry out, a "1" is merged into the most significant digit (MSD), otherwise the MSD is cleared. In the Z-pipe 10C, the most significant digit (which is was the least significant digit prior to rotation) is preserved for recording in the next cycle. On the next cycle the rotated partial product merged with the carry out in the X-pipe 10A will be loaded into the A3 18 register to compute the next partial product accumulation, denoted by the feedback path to process block 148, and discussed in cycle (X+3).

Cycle X+5: The rotated partial product accumulation from the Z-pipe 10C is loaded into the B2 17 register, the contents of the A2 16 register are rotated and merged with B2 17, denoted in process block 154. This will be loaded into the A2 16 register on the next cycle, as denoted in the feedback path to process 142 discussed in cycle (X). As discussed in the previous cycle, the rotated partial product merged with the carry out in the X-pipe 10A is loaded into the A3 18 register to compute the next partial product accumulation. Therefore, during process block 154, as the multiplicand is processed one digit at a time, these digits are effectively shifted out and the result digits are shifted into the B2 17 register.

It will be appreciated that nine times the operand plus the previous partial product accumulation may result in a carry out for the current partial product accumulation calculation. Because this carry out is necessary for the next computation, the most significant digit of the B1 15 register is preloaded with a "1" as discussed in process block 120 (FIG. 2). When the result from the partial product accumulation is computed and placed into the A1 14 register, it is rotated for the next computation. If the previous result generated a carry out, the preloaded "1" is merged into the corresponding digit, otherwise, the digit is cleared as discussed in process block 152. Note that the B1 15 register is used to hold the rest of the multiplicand digits in the cases where the multiplicand is longer than a double-word in length. These digits will be processed using the same algorithm once an excess double-word swap is performed in process block 162 (FIG. 2).

Excess Double—Word Swap

Continuing once again with FIGS. 1 and 2, as previously described in the setup section, if a multiplicand is longer then one double-word, the extra digits are saved and placed in the B1 15 register. Once all of the digits from the low order double-word have been processed, an excess double-word swap occurs. Decision block 160 ascertains if there was an excess double-word, and if so, the methodology 100 branches to optional path 162 for the excess double-word swap. As may be expected if the swap is not needed, that methodology 100 continues to process block 180 for the align and store function.

During the excess double-word swap procedure, the result digits that have been accumulating in the B2 17 and E 20 register are loaded into the B1 15 register (preserving the leading "1" so we can continue to correctly compute the overflow cases), and the most significant digits of the multiplicand are loaded into the A2 16 register. This swapping process has been integrated into the algorithm so digits can continue to be processed while the swapping is occurring, thereby maintaining an average of approximately 2 cycles per digit for the multiplication algorithm 100.

The pipeline diagram for the excess double-word swap, and how it is integrated with the algorithm discussed above is shown in the Table 3 below. As shown below, the swapping function is completed in 3 cycles.

before swapping began and contains the unprocessed multiplicand digits plus the leading "1" in the msd). Register B1 15 is loaded with the output of bit logic unit Blu2 24G and contains the processed result digits merged with a "1" in the most significant digit for processing the overflow cases as discussed above. Register A2 16 is not rotated into the bit logic unit Blu2 24G this iteration (The result digit in the msd of register B2 17 will overwrite the "1" in register A2 16. Likewise, the multiplicand digit ("V" in Table 2) currently in the lsd of register A2 16 has not yet been processed).

Align for Storage

Returning once again to FIGS. 1 and 2, the final step for the algorithm and methodology 100 is to align the data from each register and store it as depicted at process block 180. In an exemplary embodiment, this is a relatively complex task since data must be aligned and merged from 3 different registers, realigned for storage, and split between up to 3 different double-words. Rather then first aligning the data between the registers for an initial merge before realigning the data for storage, this algorithm integrated the data alignment and merging with the last four cycles necessary to compute the

TABLE 3

A pipeline diagram for the excess double-word swap.

| Cycle X | Cycle X + 1 | Cycle X + 2 | Cycle X + 3 | Cycle X + 4 | Cycle X + 4 |
|---|---|---|---|---|---|
| A2 ⇐ Blu2; Determine RFs for Partial Product T; □ A3, B3 ⇐ RF; Compute Partial Product S; E, A1 ⇐ Dec; Rotate Partial Product Accumulation R and merge CO in Blu1; Rot3 rotates Partial Product Accumulation R; | RF Read for T; B1 sent through Bin 1 Unchanged A3 ⇐ Dec; B3 ⇐ Blu1; Compute Partial Product Accumulation S; | A2 ⇐ Blu2; Determine RFs for Partial Product U; A3, B3 ⇐ RF; Compute Partial Product T; B2 ⇐ Bin1; B2 sent through Bin2 unchanged; Rotate A2 and Merge with B2 MSD in Blu2; | RF Read for U; | A2 ⇐ Blu 2 Determine RFs for Partial Product V; Begins processing first Excess Double-Word Digit; | |
| | B2 ⇐ Rot 3; Rotate A2 and merge lsd of R into msd of A2 in Blu2; | E, A1 ⇐ Dec; Rotate Partial Product Accumulation S and merge CO in Blu1; Rot3 rotates Partial Product Accumulation S; | A3 ⇐ Dec; B3 ⇐ Blu1; Compute Partial Product Accumulation T; A2 ⇐ Bin2 B1 ⇐ Blu2 B2 ⇐ Rot 3: Don't Rotate A2 and merge lsd of S into msd of A2 in Blu2 overwriting "1" swap complete; B1 now swapped with rotated & merged A2 | A3, B3 ⇐ RF; Compute Partial Product U; E, A1 ⇐ Dec; Rotate Partial Product Accumulation T + merge CO in Blu1; Rot3 rotates Partial Product Accumulation T; | RF Read for V; A3 ⇐ Dec; B3 ⇐ Blu1; Compute Partial Product Accumulation U; |
| | | | | | B2 ⇐ Rot 3; Rotate A2 and merge lsd of T into msd of A2 in Blu2; |

Cycle X+1: The data in the B1 15 register is sent unchanged through the binary adder Bin1 24F in the X-pipe 10A.

Cycle X+2: The binary adder Bin1 24F output is loaded into register B2 17. The data from register B2 17 is sent unchanged through the binary adder Bin2 24H in the Y-pipe 10A. Register A2 16 is rotated and merged in with the "1" in the msd of register B2 17 through the bit logic unit Blu2 24G.

Cycle X+3: Register A2 16 is loaded with the contents of binary adder Bin2 24H (this was the contents of register B1 15 final product. For the cases where the result crosses two double-word boundaries, one additional cycle is necessary to store the results, otherwise alignment and storage is integrated into the last 6 completion cycles required to drain the product computation pipeline discussed above.

The number of cycles for this algorithm to complete is equal to two times number of digits in the multiplier or multiplicand (which ever is shorter unless the multiplicand has more then 2 double-words of significant digits) plus two cycles for startup, and six cycles to drain the computation pipeline align and store the final results.

The disclosed invention can be embodied in the form of computer, controller, or processor 1 implemented processes and apparatuses for practicing those processes. The present invention can also be embodied in the form of computer program code containing instructions embodied in tangible media 2, such as floppy diskettes, CD-ROMs, hard drives, or any other computer-readable storage medium, wherein, when the computer program code is loaded into and executed by a computer, controller, or processor 1, the computer, controller, or processor 1 becomes an apparatus for practicing the invention. The present invention may also be embodied in the form of computer program code as a data signal 3, for example, whether stored in a storage medium, loaded into and/or executed by a computer, controller, or processor 1, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, 1 the computer program code segments configure the processor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for decimal multiplication in a superscaler processor comprising:
    a first pipeline including: a first register; a second register; a third register; an execution unit including a bit logic unit and a binary adder in operable communication with said first register, said second register, and said third register; a first rotator in operable communication with said first register and said execution unit; and a carry register in operable communication with said execution unit;
    a second pipeline comprising: a fourth register; a fifth register; a sixth register; a second execution unit including another bit logic unit and another binary adder in operable communication with said fourth register, said fifth register, and said sixth register; and a rotator in operable communication with said fourth register and said execution unit;
    a third pipeline comprising: a seventh register; a eighth register; a ninth register; a decimal adder in operable communication with said seventh register and said eighth register, a rotator in operable communication with said ninth register;
    a general register file for storage and retrieval of data;
    an operand buffer for obtaining a first operand and a second operand; and
    a communication bus for communication among at least two of said first pipeline, said second pipeline, said third pipeline, said general register and said operand buffer;
    wherein a multiplier, a multiplicand, an effective multiplier and an effective multiplicand are established from a significant digit comparison between said first operand and said second operand; and a partial product term is generated and accumulated every two cycles;
    wherein said partial product terms are created from said effective multiplicand and multiples of said effective multiplier, said multiples stored in the general register file, said multiples being ones times said effective multiplier, two times said effective multiplier, four times said effective multiplier and eight times said effective multiplier and said partial product terms are added to an accumulation of previous partial product terms shifted one digit right such that a digit shifted off is preserved as a result digit.

2. The system of claim 1 wherein product digits of said accumulation of previous partial product terms are aligned and merged for storage while said partial products are generated and accumulated.

3. The system of claim 1 wherein said carry out register, said first rotator and said bit logic unit of said execution unit are integrated as a single shifter.

4. The system of claim 1 wherein said effective multiplicand is established as whichever of said first operand and said second operand possesses fewest significant digits.

* * * * *